(12) United States Patent
MacInnis

(10) Patent No.: US 9,137,541 B2
(45) Date of Patent: Sep. 15, 2015

(54) VIDEO DATA CACHE

(75) Inventor: Alexander MacInnis, Los Altos, CA (US)

(73) Assignee: BROADCOM CORPORATION, Irvine, CA (US)

( * ) Notice: Subject to any disclaimer, the term of this patent is extended or adjusted under 35 U.S.C. 154(b) by 2682 days.

(21) Appl. No.: 10/850,911

(22) Filed: May 21, 2004

(65) Prior Publication Data

US 2004/0264565 A1 Dec. 30, 2004

Related U.S. Application Data

(60) Provisional application No. 60/473,282, filed on May 23, 2003.

(51) Int. Cl.
*H04N 7/12* (2006.01)
*H04N 11/02* (2006.01)
*H04N 11/04* (2006.01)
*H04N 19/433* (2014.01)

(52) U.S. Cl.
CPC .................................. *H04N 19/433* (2014.11)

(58) Field of Classification Search
USPC ............. 375/240.01, 240.12, 240.25, 240.26
See application file for complete search history.

(56) References Cited

U.S. PATENT DOCUMENTS

| | | | | |
|---|---|---|---|---|
| 4,682,283 A * | 7/1987 | Robb | ............................ | 711/201 |
| 5,142,676 A * | 8/1992 | Fried et al. | .................... | 711/152 |
| 5,530,837 A * | 6/1996 | Williams et al. | ............. | 711/157 |
| 5,850,632 A * | 12/1998 | Robertson | ..................... | 711/170 |
| 6,694,420 B2 * | 2/2004 | Huang | .......................... | 711/200 |
| 7,062,617 B2 * | 6/2006 | Dundas | ........................ | 711/154 |

\* cited by examiner

*Primary Examiner* — Geepy Pe
(74) *Attorney, Agent, or Firm* — Foley & Lardner LLP; Christopher J. McKenna; Paul M. H. Pua

(57) ABSTRACT

System(s) and method(s) for a video data cache are presented herein. During decoding, the video decoder fetches portions of a reference frame. The video data cache is first checked for the portions of the reference frame. If the portion of the reference frame is found in the video data cache, the portion is fetched from the video data cache. The foregoing avoids a DRAM fetch and cycles associated with the DRAM fetch.

20 Claims, 5 Drawing Sheets

VIDEO DATA CACHE

RELATED APPLICATIONS

This application claims priority to Provisional Application for U.S. patent Ser. No. 60/473,282, entitled "Video Data Cache" filed by MacInnis on May 23, 2003, which is incorporated herein by reference for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In the field of digital video compression and decompression, the compression format often follows standards such as MPEG-2. A newer standard under development is known as MPEG AVC, also called MPEG-4 Part 10 or ITU H.264; it is referred to here as simply AVC. MPEG-2, AVC and other digital video compression formats generally utilize motion-compensated image prediction as part of the compression and decompression processes.

In motion compensated image prediction, also called motion compensation ("MC"), the encoder finds a region of a reference image that can be translated such that the translated image region resembles a region of the image currently being compressed. The region size may be, e.g., 16×16 (also called a macroblock), or it may be smaller, such as 16×8, 8×16, 8×8, 8×4, 4×8, 4×4, or other sizes and shapes, depending on the specifics of the video compression format. The region being predicted is called an MC block. The reference picture may be any of a number of pictures that have previously been encoded, in the case of an encoder, or that have previously been decoded, in the case of a decoder. Reference pictures are normally stored in DRAM rather than on-chip memory, due to the size of the memory required to store all the possible reference pictures.

The translation in typical video compression formats involves translation or re-positioning in the horizontal (X) and/or vertical (Y) axes, by amounts that may include both whole pixel (integer) and fractional pixel amounts. Such translations are referred to as motion vectors (MV). A pixel is a picture element, also known as a pel. X & Y translations using MVs with fraction components, involve the use of multi-tap filters to accomplish the fractional pixel re-positioning. In the case of MPEG-2, a 2-tap filter in each of the X and Y axes may be used. In the case of AVC, a 6-tap filter in each of the X and Y axes may be used. As a result of these filters, the number of pixels that are needed from the reference image to produce the correct MC prediction may be greater than the size of the MC block. For example, if the MC block size is 4×4 and the fractional pixel filter uses 6 taps in each dimension, the size of the region of pixels needed to perform the prediction is $(4+6-1) \times (4+6-1) = 9 \times 9$.

The integer (or whole pixel) portion of the MVs can in general be of almost any value which points to any portion of the reference image. One effect of this potential variability is that the reference picture region needed for MC may fall across memory page boundaries, as well as across memory word boundaries.

As a result of the use of motion compensation, the large degree of variability possible in the values of the MVs, the variable and possibly small size of the MC blocks, and the possible use of fractional pixel filters for MC, the number of DRAM cycles required to read all of the reference image regions needed to encode or decode one picture may be very high, resulting in expensive systems for encoding and decoding digital video. Encoding or decoding of digital video is generally considered to be a real time process, i.e., one which should be completed on a specific schedule in order to ensure proper operation. The real time nature of video encoding and decoding makes it difficult or impossible to spread DRAM accesses over extended intervals of time, thereby increasing the cost of performing the DRAM accesses required for MC operations in real time.

Conventional data caches in microprocessors, such as described in "*Data Type Dependent Cache Pre-fetching for MPEG Applications*", R. Cucchiara, A. Prati and M. Piccardi, *IEEE (Journal unknown)*, 2002, are not sufficiently efficient in terms of reducing the number of DRAM cycles required to provide the reference image regions needed for MC, nor in terms of preventing unwanted DRAM cycle usage, nor in terms of minimizing the overall physical size of the cache.

Conventional CPU data caches typically use either a 2-way or 4-way set associative design. These designs do not work very efficiently. Typical CPU caches are encumbered by a need to complete a tag match and data return in one or two clock cycles, which results in increased cost, compared to the present invention.

Pre-fetching and aggregation of read requests (for DRAM efficiency) without caching are described in UK patent number GB2343808. Pre-fetching can help in some cases by predicting what data is likely to be requested and fetching data before it is requested. However such predictions are not always accurate and such pre-fetching sometimes results in reading data from DRAM that is in fact not ever requested by the video decoder. As a result the DRAM performance is actually made worse, rather than improved, in some cases, such as video sequences that are already worst case. This is very undesirable.

Aggregation of reads can help make DRAM transactions more efficient, but it does not help with re-using data that is returned from DRAM as part of one aggregated set of reads if some of that data is requested in a subsequent request by the decoder.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Systems and methods for a video cache are presented herein.

In one embodiment, there is presented a method for providing data to a video decoder. The method comprises comparing a target address to a plurality of memory address ranges; if the target address is within one of the plurality of memory address ranges: examining a particular one of a plurality of indicators associated with the memory address range, the particular one of the plurality of indicators associated with the memory address and indicating whether a data word at the target address is in a cache; and providing a data word at a cache address associated with the particular one of the plurality of indicators to the video decoder; and providing the data word at the target address from another memory, if the target address is not within one of the plurality of memory ranges or if the particular one of the indicators indicates that the data word at the target address is not in the cache.

In another embodiment, there is presented a circuit for providing data at a target address to a video decoder. The circuit comprises logic, a cache, and a memory. The logic compares the target address to a plurality of memory address ranges. The cache comprises a plurality of sections corresponding to the plurality of memory ranges, each section comprising data words allocated to memory addresses in the address range corresponding to the section. The memory stores a plurality of words corresponding to the plurality of memory address ranges, each word comprising a plurality of bits corresponding to memory addresses in the memory address range corresponding to the word, wherein the bit indicates whether a data word in the cache allocated to the memory address corresponding to the bit stores data from the memory address.

These and other advantages and novel features of the present invention, as well as illustrated embodiments thereof will be more fully understood from the following description and drawings.

DETAILED DESCRIPTION OF THE INVENTION

Figure 1:
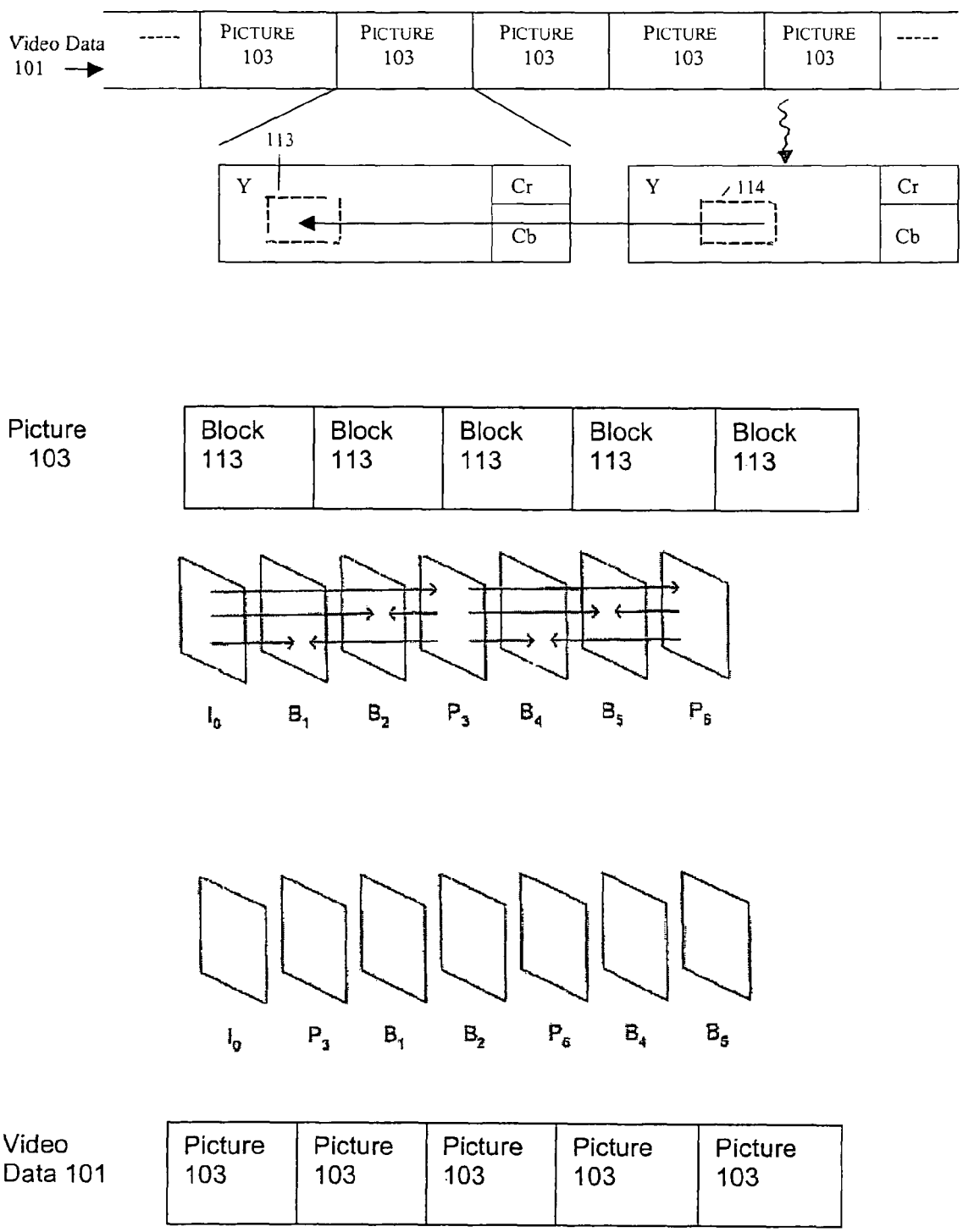
FIG. 1 is a block diagram describing an exemplary process for encoding video data.

FIG. 1 illustrates a block diagram of an exemplary Moving Picture Experts Group (MPEG) encoding process of video data 101, in accordance with an embodiment of the present invention. The video data 101 comprises a series of pictures 103. Each picture 103 comprises two-dimensional grids of luminance Y, chrominance red Cr, and chrominance blue Cb, pixels.

Although each pixel in each picture 103 can be recorded, the amount of memory required could be prohibitive. Additionally, the foregoing would also require large amounts of bandwidth for transmitting the video data 101. Instead, the pictures 103 are compressed using techniques that take advantage of spatial and temporal redundancies.

Temporal redundancies arise because of the fact that proximate pictures 103 are likely to have similarities. Thus, the differences between a picture 103, a predicted picture, and another picture, a reference picture, can be encoded. During decoding, the differences can be applied to the reference picture to recover the predicted picture. Encoding the difference between the predicted picture and the reference picture, as opposed to encoding the predicted picture directly, requires significantly less bandwidth if the predicted picture and the reference picture are similar.

Motion causes an increase in the differences between pictures, the difference being between corresponding pixels of the pictures, which necessitate utilizing large values for the transformation from one picture to another. The differences between the pictures may be reduced using motion compensation, such that the transformation from picture to picture is minimized. The idea of motion compensation is based on the fact that when an object moves across a screen, the object may appear in different positions in different pictures, but the object itself does not change substantially in appearance, in the sense that the pixels comprising the object have very close values, if not the same, regardless of their position within the frame.

Accordingly, the luminance pixels Y, chrominance red pixels Cr, and chrominance blue Cb two-dimensional grids can be divided into blocks 113. The blocks 113 in a predicted picture 103 can be compared to portions of other reference pictures 103. When an appropriate (most similar, or containing the same object(s)) portion of a reference frame 103 is found, the differences between the portion of the reference frame 103, known as a reference pixel block 114, and the block 113 can be encoded. The differences can be encoded using a variety of transformations, and both lossy and lossless compression.

The locations of the reference pixel blocks 114 in the reference pictures 103 are recorded as a motion vectors. The motion vectors describes the spatial displacement between the block 113 and the reference pixel block 114. In AVC, the blocks 113 can be 16×16 pixels (also called a macroblock), or smaller, such as 16×8, 8×8, 8×4, 4×8, 4×4 pixels or other sizes and shapes. A data structure representing the picture 103 includes the encoded blocks 113 and the motion vectors.

In both MPEG-2 predicted pictures 103 can be predicted from as many as two reference pictures, and in AVC, predicted pictures 103 can be predicted from one, two or more reference pictures. Intracoded Pictures, or I-pictures, are not predicted from other pictures. In MPEG-2, Predicted Coded Pictures, or P-pictures, are predicted from one reference picture that is displayed prior to the P-picture. In AVC, each P-type block is predicted from any one of a plurality of reference pictures. In MPEG-2, Bidirectionally Predicted Pictures, or B-pictures, are predicted from one reference picture that is displayed prior to the B-picture and another reference picture that is displayed after the B-picture. In AVC, each B-type or bi-predicted block is predicted from any two of a plurality of reference pictures.

$I_0$, $B_1$, $B_2$, $P_3$, $B_4$, $B_5$, and $P_6$ are exemplary pictures. The arrows illustrate the prediction dependence of each picture. For example, picture $B_2$ is dependent on reference pictures $I_0$, and $P_3$. The foregoing data dependency among the pictures requires decoding of certain pictures prior to others. Additionally, the use of later pictures as reference pictures for previous pictures requires that the later picture is decoded prior to the previous picture. As a result, in MPEG-2 when B pictures are present the pictures cannot be decoded in temporal display order, i.e. the pictures may be decoded in a different order than the order in which they will be displayed on the screen. Accordingly, the pictures are transmitted in a data dependent order, and the decoder reorders the pictures for presentation after decoding. $I_0$, $P_3$, $B_1$, $B_2$, $P_6$, $B_4$, $B_5$, represent the pictures in data dependent and decoding. order.

The video 101 is represented by the encoded pictures 103. The video 101 is typically transmitted in the payload portion of transport packets. The transport packets can be multiplexed with other transport packets carrying other content, such as another video 101 or an audio stream. The multiplexed transport packets form what is known as a transport stream. The transport stream is transmitted over a communication medium for decoding and displaying.

Figure 2:
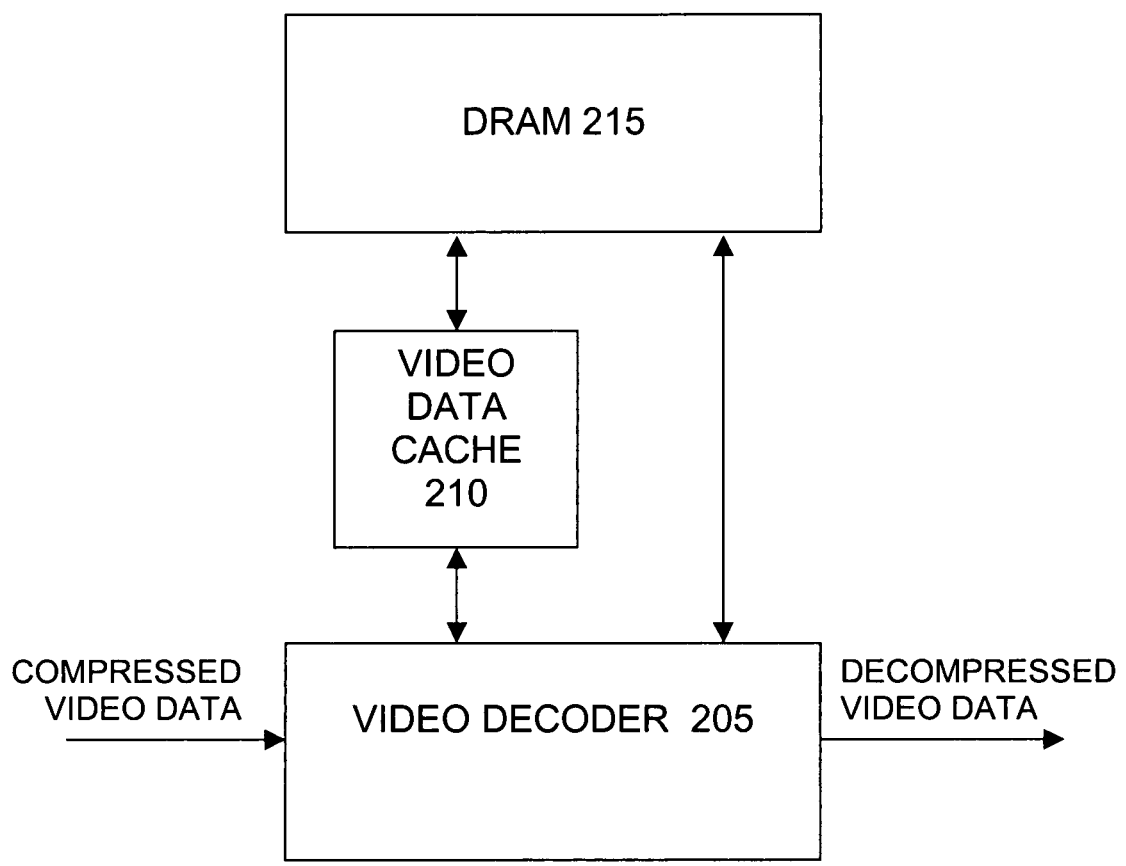
FIG. 2 is a block diagram of an exemplary circuit in accordance with an embodiment of the present invention.

Referring now to FIG. 2, there is illustrated a block diagram describing an exemplary circuit for decoding the video data in accordance with an embodiment of the present invention. The circuit includes a video decoder 205, a video data cache 210, and frame buffers in Dynamic Random Access Memory (DRAM) 215. The video decoder 205 receives and decompresses the compressed video, thereby generating a decompressed video.

The video decoder 205 decodes the compressed video on a picture 103 by picture 103 basis. The decompressed video is a series of pictures 103. The video decoder 205 decodes reference pictures 103 prior to decoding predicted pictures 103 that are predicted from those reference pictures. When the video decoder 205 decodes a reference picture 103, the video decoder 205 writes the reference picture 103 into the DRAM 215. One picture may function as both a reference picture and a predicted picture.

As noted above, the predicted picture 103 is divided into blocks 113 that are predicted from reference pixel blocks 114 within reference pictures 103. To decode the predicted picture 103, the video processor decoder 205 retrieves the reference pixel blocks 114.

Retrieving the reference pixel blocks 114 from DRAM 215 requires a large number of DRAM cycles. To facilitate decoding, the video data cache 210 retains data retrieved from the DRAM 215 in response to DRAM read requests produced by the video decoder 205. Requests by the video decoder 205 for data in DRAM 215 are first checked by the video data cache 210 for the presence of some or all of the requested data in the cache 210. Data values that are already in the video data cache 210 (hits) are provided to the video decoder processor 205 without requiring DRAM 215 activity. Requested data that are not in the video data cache 210 are requested from the DRAM 215.

The video data cache 210 is organized into tag blocks, each of which cover a range of addresses that may represent a rectangular region of video data from a picture 103 stored in the DRAM 215. Requested data addresses are checked against tag block address ranges.

Checking of addresses in tag blocks can be implemented very quickly and in a pipelined fashion, resulting in very high throughput and low cost. The tag block organization results in efficient use of the video cache memory 210.

In one embodiment, only those DRAM 215 words are read that are needed to meet requests from the video decoder processor 205, and there are no speculative reads from DRAM 215. As a result, the DRAM 215 cycle utilization is not increased compared to systems that do not have a video data cache, regardless of the specifics of the video, such as motion vectors and reference picture selection.

Figure 3:
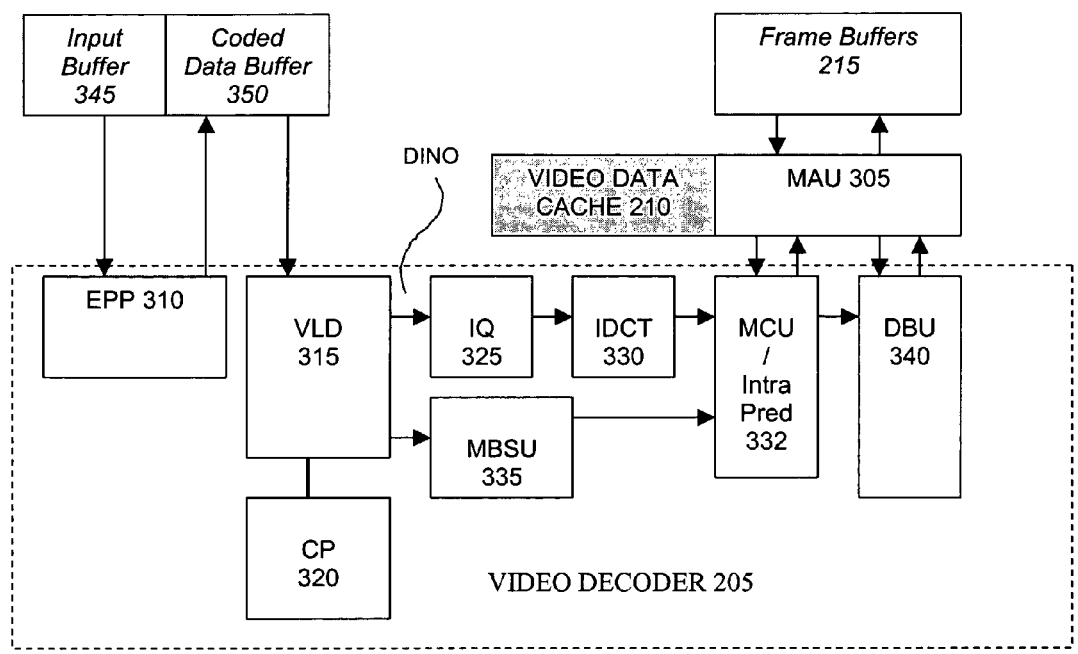
FIG. 3 is a block diagram of an exemplary video decoder and video data cache in accordance with an embodiment of the present invention.

Referring now to FIG. 3, there is illustrated a block diagram of a video decoder 205 and memory access unit 305 in accordance with an embodiment of the present invention. The video decoder processor 205 includes an entropy code preprocessor 310, a variable length decoder 315, a central processor 320, an inverse quantizer 325, an inverse discrete cosine transformation block 330, a motion compensation unit 332, a macroblock setup unit (MBSU) 335, and a deblocking unit (DBU) 340. The entropy code preprocessor 310 reads the compressed video data from an input buffer 345, decodes the entropy code associated with the video data, and writes the results in a coded data buffer 350.

The variable length decoder 315 reads the compressed video data from the coded data buffer 350, on a block 113 by block 113 basis. The variable length decoder 315 decodes the variable length coding associated with blocks 113 in the compressed video data. The foregoing results in a set of quantized frequency coefficients and a set of motion vectors. An inverse quantizer 325 inverse quantizes the frequency coefficients, thereby resulting in frequency domain coefficients. The inverse discrete cosine transformation block 330 applies inverse discrete cosine transformation to the frequency domain coefficients, resulting in pixel domain data.

If the block 113 is associated with a predicted picture, a P-picture or a B-picture, the pixel domain data represents the difference between the block 113 and a motion-compensated version of a reference pixel block 114 in one or more reference pictures 103. The motion vectors indicate the location of the reference pixel blocks 114 in the reference pictures 103. The motion compensation unit 332 sends requests for the reference pixel block 114 within the reference pictures 103 to the memory access unit 305. The memory access unit 305 determines the frame buffer word addresses storing the reference pixel block 114. In an exemplary embodiment, the frame buffer 215 can comprise 128-bit/16 byte gigantic words (gwords).

The memory access unit 305 includes a video data cache 210 that is organized into tag blocks, each of which covers a range of frame buffer gword addresses that may represent a rectangular region of video data from a reference picture 103 stored in the frame buffer 215. When the video decoder 205 requests a gword from a frame buffer gword address, the frame buffer gword address is checked against tag block address ranges.

The memory access unit 305 first checks requests by the video decoder processor 205 for data in DRAM 215 for the presence of some or all of the requested data in the video data cache 210. The memory access unit 305 provides data values that are already in the video data cache 210 (hits) to the video decoder processor 205 without requiring DRAM 215 activity. The memory access unit 305 provides requested data that is not in the video data cache 215 from the DRAM 215. The foregoing can save a significant number of DRAM cycles.

Figure 4A:
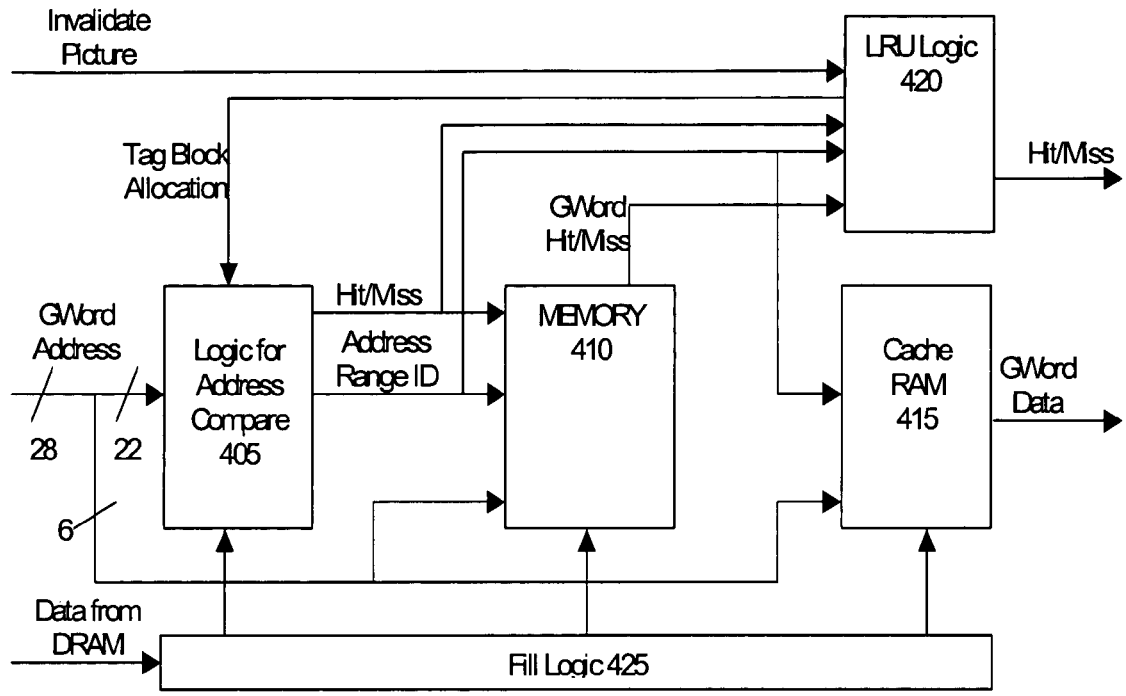
FIG. 4A is a block diagram of an exemplary video data cache in accordance with an embodiment of the present invention.

Referring now to FIG. 4A, there is illustrated a block diagram describing an exemplary video data cache 210 in accordance with an embodiment of the present invention. The video data cache 210 comprises logic 405 for comparing a frame buffer gword address requested by the video decoder 205 (a target address) to address ranges, a memory 410 for looking up tags associated with the address ranges, a cache RAM 415, logic 420 for determining the least recently used tag, and logic 425 for filling the cache RAM 415.

The cache RAM 415 comprises gwords. The video data cache 210 allocates sections comprising a number of gword in the cache RAM 415 to address ranges, each addressing a corresponding number of gwords in the DRAM. In an exemplary embodiment, the video data cache 210 can allocate 24 sections comprising 64 gwords to 24 non-overlapping address ranges, each addressing 64 consecutive gwords in the DRAM. Preferably, each address range starts with an address that is a multiple of 64 times the size of a gword.

The logic 405 determines whether a target address is within any of the address ranges. Where the address ranges address 64 gwords, the logic 405 for comparing can determine whether the target address is within any of the address ranges by comparing the target address to the starting addresses of the address ranges, without the six least significant bits. For example, where 28-bit gword addresses are used, the logic for comparing tag block start addresses 405 can compare the 22 most significant bits of the given gword address to the 22 most significant bits of the starting address ranges.

The logic 405 outputs a hit/miss indicator indicating whether the given gword address is within any of the address ranges, and if the given gword is within an address range, an identification of the address range, i.e. address range ID. Where there are 24 address ranges, the video data cache 210 can assign a binary number from 00000 to 10111 (0 to 23) to each of the address ranges. When the given gword address falls within an address range, the logic 405 can output the binary number assigned to the address range as the address range ID.

The memory 410 includes data words corresponding to each of the address ranges. The data words include one bit for each of the addresses in the address range. For example, where there are 24 address ranges, each of which addressing 64 gwords, the memory 410 includes 24 data words of 64-bits.

The individual bits correspond to each address in the address range, such that each bit in the memory 410 corresponds to one gword address, and the 64 bits of one word in memory 410 correspond to the 64 gword addresses corresponding to one of the 24 address ranges. As noted above, the cache RAM 415 comprises sections corresponding to the address ranges, and the sections include gwords corresponding to the addresses in the address range. The bit corresponding to an address indicates whether the gword in the cache RAM 415 corresponding to the address in the DRAM, is storing the data from the address in the DRAM.

The addresses of the data words in the memory 410 are the binary numbers assigned to the corresponding address range. Therefore, the output of the logic 405 is the address of the data word in the gword tag memory 410 corresponding to the identified address range.

Figure 4B:
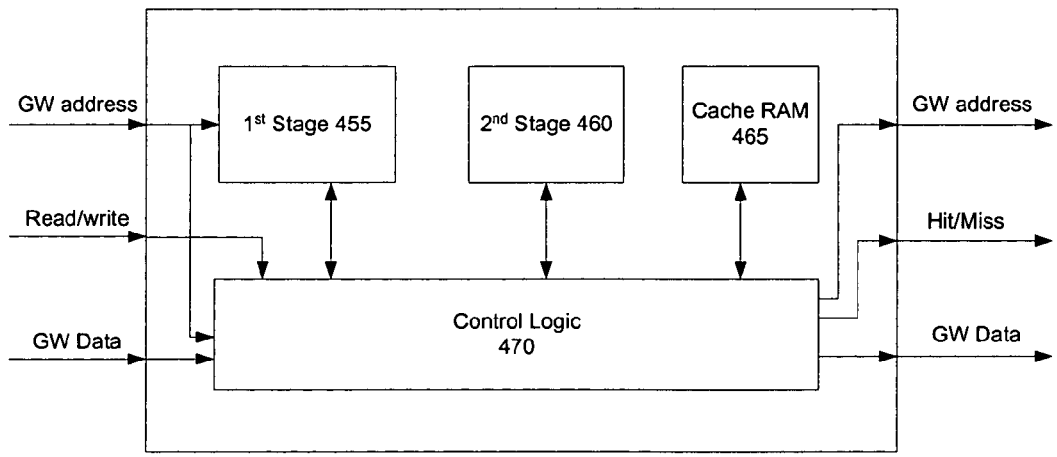
FIG. 4B is a block diagram of another exemplary video data cache.

Referring now to FIG. 4B, there is illustrated a block diagram describing another exemplary video data cache 210 in accordance with an embodiment of the present invention. The video data cache 210 comprises a first stage 455 for comparing a frame buffer gword address requested by the video decoder 205 (a target address) to address ranges, a second stage 460 for looking up tags associated with the address ranges, a cache RAM 465, and control logic 470 for determining the least recently used tag, filling the cache RAM 465, and providing the gword data and gword address.

Figure 5:
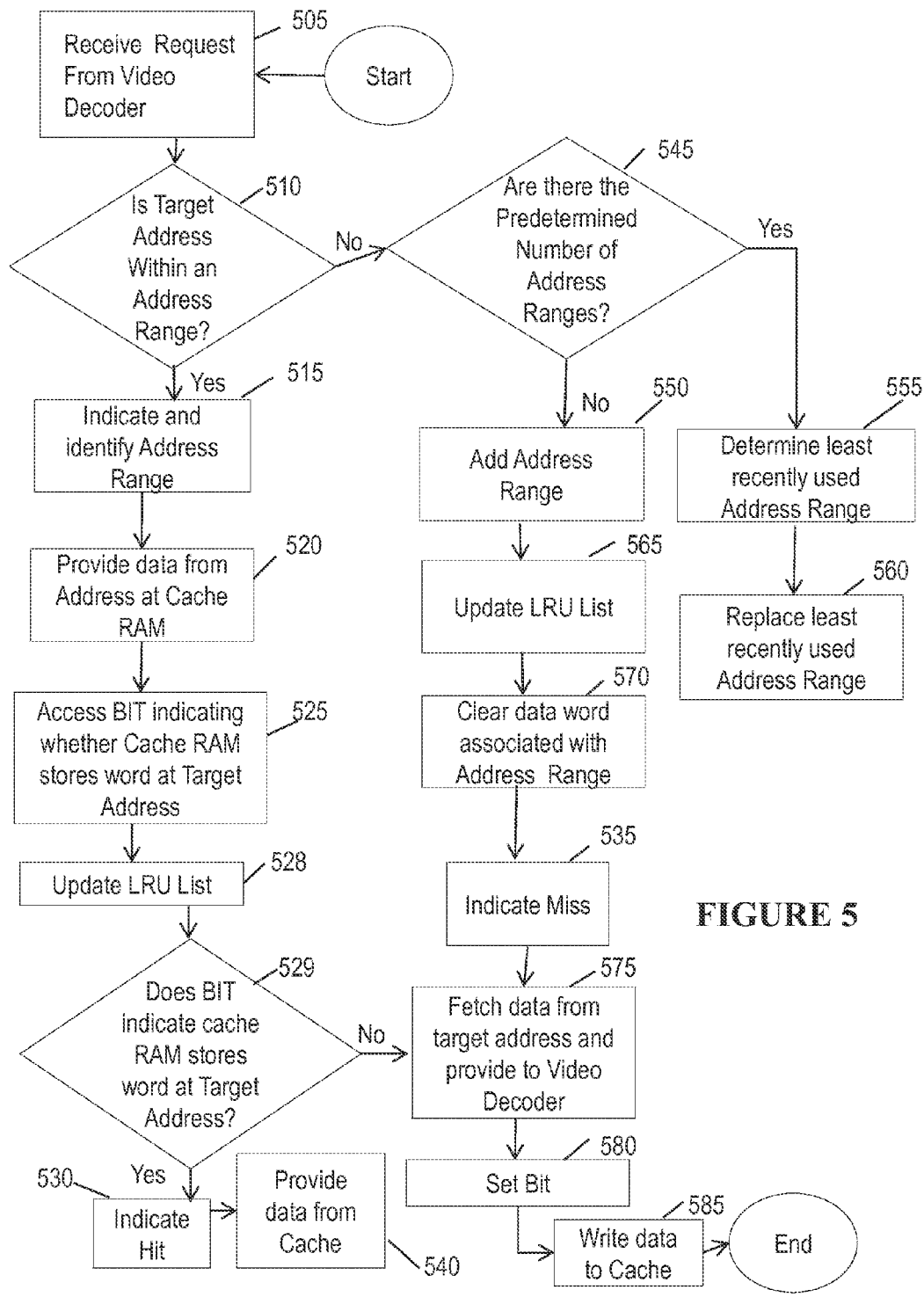
FIG. 5 is a flow diagram for fetching data in accordance with an embodiment of the present invention.

Referring now to FIG. 5, there is illustrated a flow diagram for accessing a target address in accordance with an embodiment of the present invention. The flow diagram will be described with reference to the video data cache in FIG. 4A. Although the foregoing the flow diagram is described with reference to the video data cache in FIG. 4A, the following can also be achieved by corresponding structures of the video data cache described in FIG. 4B. When the video decoder processor 205 requests (505) to access a gword at a target address, the logic 405 compares (510) the address ranges to the gword address. If the given gword address is found to fall within an address range, the logic 405 provides (515) an indicator indicating the foregoing and the binary number identifying the address range to memory 410, the LRU logic 420, and the cache RAM 415.

The cache RAM 415 also receives the six least significant bits of the given gword address. The binary number provided from logic 405 and the six least significant bits of the given gword address form a cache RAM 415 address of the cache RAM gword associated with the given gword address. The cache RAM 415 provides (520) the data stored at this address.

The tag memory also receives the six least significant bits of the given gword address. The binary number provided by logic 405 and the six least significant bits of the given gword address uniquely identify a bit that is associated with the given gword address. The bit indicates whether the gword in the cache RAM 415 that is associated with the given gword address stores the data at the given gword address in the DRAM. The tag memory 410 provides (525) the bit to logic 420.

The logic for determining the least recently used address range 420 receives the binary number output from logic 405. The logic 420 uses the binary output from logic 405 to maintain a list of the address ranges, and ordering the address ranges based on most recent use. The logic 420 updates the list to indicate the identified ranges as the most recently used address range (528).

If the bit indicates that the gword in the cache RAM 415 that is associated with the given gword address stores the data at the given gword address in the DRAM (529), the logic 420 outputs (530) a hit/miss indicator indicating that there was a hit. Otherwise, the logic 420 indicates (535) a miss. The memory access unit 305 provides (540) the output of the cache RAM 415, when the logic 420 indicates a hit.

If the given gword address is found not to fall within any of the address ranges during 510, an address range covering the gword address needs to be added to the logic for comparing address ranges 405. The logic for comparing the tag block addresses 405 has the capacity to compare the given gword address to a maximum number of address ranges. If the logic 405 compares the given gword address to the maximum number of address ranges, one of the address ranges needs to be replaced with the address range covering the given gword address.

The logic 420 also receives a signal from the logic for comparing address ranges 405, indicating that a given gword address does not fall within an address range, whenever the foregoing occurs. The logic 420 first determines if logic 405 is comparing the maximum number of address ranges (545).

If not is not comparing the maximum number of address ranges, the logic 420 causes logic 405 to be configured to add (550) the address range that includes the target address. Logic 420 assigns a binary number that is not currently assigned to an address range that includes the target address. The starting address of the address range is the target address with the six least significant bits truncated to 0. The logic 405 configures to output the binary number assigned by logic 420 when another target address falls within the address range.

If the logic 420 determines logic 405 is comparing the maximum number of address ranges, the logic 420 determines (555) the least recently used address. The logic 420 causes logic 405 to configure to replace (560) the least recently used address range with the address range including the target address. Logic 420 assigns the binary number assigned to the least recently used address range to the address range including the target address.

The logic 405 configures to include the new address range in future comparisons, exclude any replaced address range, and output the binary number assigned by logic 420 when another target address falls within the new address range.

In either case, logic 420 updates (565) to indicate the new address range as the most recently used. The tag memory 410 clears (570) the data word associated with the binary number provided by logic 420. The logic 420 also outputs a hit/miss indicator indicating a miss (535).

When the logic 420 indicates a miss, the memory access unit 305 disregards the outputs from cache RAM 415, fetches (575) the data stored at the target address from the DRAM, and provides the data to the video decoder 210. When the memory access unit 305 fetches the data, the memory access unit 305 also provides the data to the fill logic 425.

The fill logic 425 provides the address corresponding to the data to the logic 405. The logic 405 provides the binary number assigned to the address range that includes the given gword address. The fill logic 425 uses the binary number and the six least significant bits to address the cache RAM 415 and identify the bit in the tag memory 410 that is associated with the given gword address. The fill logic 425 sets the bit (580), and writes (585) the data to the cache RAM address.

It is possible that the address range that includes the given gword address does not fall within any of the address ranges compared by logic 405. This occurs if between the time that the logic 420 reported a miss, and the time that the DRAM returned the data from the given gword, the address range that included the given gword address became the least recently used address range and was subsequently replaced with another address range by logic 420. Where the foregoing occurs, the fill logic 425 discards the data.

One embodiment of the present invention may be implemented as a board level product, as a single chip, application specific integrated circuit (ASIC), or with varying levels integrated on a single chip with other portions of the system as separate components. The degree of integration of the monitoring system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device with various functions implemented as firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A method of providing data to a video decoder, said method comprising:
   determining, by a memory access unit, whether a target address is within a plurality of memory address ranges, the target address comprising an address word and representing an address of a first memory at which a data word requested by a video decoder is stored;
   identifying a particular one of a plurality of indicators stored in a second memory using a plurality of bits from the address word of the target address, based on a determination that the target address is within a first memory address range of the plurality of memory address ranges, the particular one of a plurality of indicators indicating whether the requested data word is stored at a cache address in a cache memory of the video cache; and
   retrieving the particular one of a plurality of indicators from the second memory based on the determination that the target address is within the first memory address range of the plurality of memory address ranges, wherein the memory access unit is configured to:
   provide the data word at the cache address to the video decoder when the particular one of the plurality of indicators indicates that the requested data word is stored in the cache memory; and
   provide the requested data word from the first memory, when the target address is not within the plurality of memory ranges or when the particular one of the indicators indicates that the requested data word is not stored in the cache memory of the video cache.

2. The method of claim 1, further comprising:
   discarding the data word at the cache address when the particular one of the plurality of indicators does not indicate that the data word is in the video cache; and
   providing the data word at the target address from the first memory when the particular one of the plurality of indicators does not indicate that data word is in the video cache.

3. The method of claim 1, further comprising:
   writing the data word from the target address of the first memory to the cache address, when the particular one of the plurality of indicators does not indicate that the data word at the target address is in the cache; and
   setting the particular one of the plurality of indicators in the second memory to indicate that the data word is in the video cache.

4. The method of claim 1, wherein when the target address is not within any of the plurality of memory address ranges, adding an address range comprising the target address to the plurality of memory address ranges.

5. The method of claim 4, further comprising:
   removing another one of the plurality of memory address ranges.

6. The method of claim 5, wherein the another one of the plurality of memory address ranges is the least recently used one of the plurality of memory address ranges.

7. The method of claim 1, further comprising:
   comparing another target address to the plurality of memory address ranges while examining the particular one of the indicators.

8. The method of claim 1, wherein the data word comprises 16 bytes.

9. A circuit for providing data to a video decoder, said circuit comprising:
   logic configured to determine whether a target address is within a plurality of memory address ranges, the target address comprising an address word and representing an address of a first memory at which a data word requested by a video decoder is stored;
   a cache memory of a video cache comprising a plurality of sections corresponding to the plurality of memory ranges, each section comprising data words allocated to memory addresses in the address range corresponding to the section; and
   a second memory,
   wherein the logic is further configured to:
   identify a particular one of a plurality of indicators stored in the second memory using a plurality of bits from the address word of the target address, based on a determination that the target address is within a first memory address range of the plurality of memory s indicating whether the requested data word is stored at a cache address in a cache memory of the video cache;
   retrieve the particular one of a plurality of indicators from the second memory based on the determination that the target address is within the first memory address range of the plurality of memory address ranges, provide the data word at the cache address to the video decoder when the retrieved bit indicates that the requested data word is stored in the cache memory, and provide the requested data word from the first memory, when the target address is not within the plurality of memory ranges or when the particular one of the indicators indicates that the requested data word is not stored in the cache memory of the video cache.

10. The circuit of claim 9, wherein the logic is configured to indicate whether the target address falls within any of the memory address ranges, and to provide an identification of the first memory address range within which the target address falls.

11. The circuit of claim 10, wherein the second memory is configured to provide the particular one of a plurality of indicators from a particular one of a plurality of words associated with the first memory address range.

12. The circuit of claim 11, wherein the cache memory is configured to provide a particular data word from a particular one of the plurality of sections associated with the first memory address range, the particular data word assigned to the target address.

13. The circuit of claim 9, wherein the logic comprises a memory access unit.

14. The circuit of claim 9, wherein the logic is configured to write the data word from the target address of the first memory to the cache memory at the cache address when the memory access unit provides the data word from the first memory to the video decoder; and to set the particular one of a plurality of indicators to indicate that the data word is stored at the cache address.

15. The circuit of claim 9, wherein the logic is configured to determine that one of the plurality of memory address ranges is to be replaced with another address range, wherein the another address range includes the target address.

16. The circuit of claim 10, wherein the one of the plurality of memory address ranges to be replaced is the least recently used one of the memory address ranges.

17. The circuit of claim 9, wherein the data word comprises 16 bytes.

18. The circuit of claim 9, wherein the logic is configured to:

compare another target address to the plurality of memory address ranges while examining the particular one of the indicators.

19. The circuit of claim 9, wherein the logic is configured to:

discard the data word at the cache address when the particular one of the plurality of indicators does not indicate that the data word is in the video cache; and provide the data word at the target address from the first memory when the particular one of the plurality of indicators does not indicate that data word is in the video cache.

20. The circuit of claim 9, wherein the logic is configured to:

when the target address is not within any of the plurality of memory address ranges, add an address range comprising the target address to the plurality of memory address ranges.

* * * * *

UNITED STATES PATENT AND TRADEMARK OFFICE
CERTIFICATE OF CORRECTION

PATENT NO. : 9,137,541 B2
APPLICATION NO. : 10/850911
DATED : September 15, 2015
INVENTOR(S) : Alexander G. MacInnis Page 1 of 1

It is certified that error appears in the above-identified patent and that said Letters Patent is hereby corrected as shown below:

In the claims

Please replace column 10, lines 59-60 with the following corrected version:

-- memory address range of the plurality of memory address ranges, the particular one of a plurality of indicators indicating whether the requested data word is stored --

Signed and Sealed this
Fifth Day of April, 2016

Michelle K. Lee
*Director of the United States Patent and Trademark Office*